Patented Aug. 7, 1945

2,381,481

UNITED STATES PATENT OFFICE 2,381,481

HYDROCARBON CONVERSIONS AND CATALYSTS THEREFOR

John A. Anderson, Chicago, Ill., assignor to Standard Oil Company, Chicago, Ill., a corporation of Indiana No Drawing. Application August 12, 1942, Serial No. 454,567

12 Claims. (Cl. 260—683.15)

This invention relates to the catalytic conversion of hydrocarbons. More particularly it relates to the catalytic polymerization of normally gaseous hydrocarbons to normally liquid and solid hydrocarbons. Still more particularly it relates to the preparation and use of an improved group of catalysts for the polymerization of normally gaseous hydrocarbons.

It is well known to polymerize normally gaseous hydrocarbons to normally liquid hydrocarbons of the motor fuel boiling range at elevated temperatures and pressures, with or without catalysts. However, it is an object of the present invention to provide improved catalysts and a new process using such catalysts for catalytically converting normally gaseous hydrocarbons, especially to normally liquid hydrocarbons of the motor and aviation fuel boiling range. A further object is to provide an efficient catalyst which gives good yields and good product distribution. Another object of the invention is to provide a catalyst which can be employed for a relatively long time before regeneration is necessary. A more specific object is to provide an improved catalyst and process for catalytically polymerizing normally gaseous olefins to normally liquid hydrocarbons. Another object is to provide a method of preparing the unique polymerization catalyst. Other objects will become apparent hereinafter.

It has now been found that these objects can be attained by converting normally gaseous hydrocarbons in the presence of a catalyst derived by treating an activated alumina with a complex fluoric acid of the amphoteric elements in groups III and IV of the periodic table. These acids include the group consisting of fluoboric, fluosilicic and fluotitanic acids, the chemical formulas of which are $HBF_4$, $H_2SiF_6$, and $H_2TiF_6$, respectively.

One catalyst according to my invention was prepared by moistening 310 grams of dry alumina gel with water and treating the gel in an open aluminum pan containing 310 cc. of water and 50 cc. $H_2SiF_6$. The liquid was evaporated slowly to room temperature and the treated gel was finally heated to 800° F. A second catalyst was prepared by treating 310 grams of alumina gel with a solution comprising 250 cc. of water and 25 cc. of $HBF_4$ (42% Harshaw). The material was evaporated to dryness at about 70° F. and then heated slowly to 800° F. A third catalytic material was prepared by treating about 370 grams of alumina gel with about 225 cc. of a solution containing $H_2TiF_6$, drying the mixture for about 12 hours at a temperature of 100–180° F., and then heating slowly to 800° F.

The catalytic materials produced by the above treatment can be pressed, molded or extruded into pellets, or other form presenting a large surface for use in the polymerization.

Various other methods can be employed for making the catalyst. For example an excess of alumina can be used, permitting the catalyst to be formed on the surface of the material. Various supports or so-called carriers can be used as silica sand, silica gel, charcoal, bauxite, alumina, acid treated clays, kieselguhr, fuller's earth, etc. The catalyst can be deposited on the surface of the carrier by the wet method, by the method just described, or by milling or mixing the catalytic material with the carrier or other ingredient.

The catalysts of this invention can be used to effect conversion of any normally gaseous hydrocarbon alone or in an admixture which is normally gaseous and they are particularly effective for the polymerization of the $C_3$ and $C_4$ monoolefins. Conversions of such normally gaseous hydrocarbons to normally liquid products can be effected at temperatures ranging between about 350° F. and about 900° F.; preferably the temperature employed will be in the range between about 350° F. and about 700° F., particularly between about 450° F. and about 600° F. for polymerizing olefins as such or in admixture with paraffins. Higher temperatures in the range of between about 700° and 900° F. can be used to advantage when mixtures of normally gaseous hydrocarbons containing higher proportions of paraffins are subjected to conversion. Pressures can range between about 10 and 100 atmospheres and a particularly useful range is between about 200 and 700 pounds per square inch. Under these operating conditions the feed rate should be between about 0.01 and about 10 volumes of liquid feed per hour per gross volume of catalyst and preferably between about 0.1 and about 5 volumes, for example 1 volume of liquid feed per hour per gross volume of catalyst. The conversion can be effected in fixed bed, moving bed, or fluid catalytic systems.

It will be noted that the conditions specified embrace not only those where the hydrocarbons are in either liquid or vapor phase or partially in one or in the other but also conditions where the hydrocarbons are in the so-called dense phase lying above the extrapolated vapor pressure curve of the stock. It is preferred that combinations of conditions be selected from among those above specified so that maximum yields of higher boiling hydrocarbons are produced from the normally gaseous hydrocarbons.

To demonstrate the effectiveness of my catalysts in the conversion of normally gaseous hydrocarbons to higher boiling hydrocarbons the following three examples are included. It is intended that these examples shall be construed as illustrative only and not as limiting the scope of the invention.

Example 1

The catalyst prepared by treating alumina gel with fluosilicic acid in the manner outlined above was placed in a polymerization reactor. Substantially pure propylene was passed into the chamber at a rate of about .33 gram of feed/hour/cc. of catalyst at a pressure of about 200 pounds per square inch and maintained at a temperature of about 510° F. During a three-hour run under these conditions 132 grams of catalyst produced 108 grams of polymer having a specific gravity of 0.66. Thus a yield of 54% polymer by weight based on the propylene charge was obtained which is equivalent to a yield of .18 gram of polymer per cc. of catalyst per hour or a yield of .27 gram of polymer per gram of catalyst per hour.

Example 2

The catalytic material obtained by treating the alumina gel with fluoboric acid was placed in a catalyst chamber. Substantially pure propylene was passed into the chamber at a rate of about .33 gram of feed/hour/cc. of catalyst at a pressure of about 200 pounds per square inch and maintained at a temperature of about 500° F. During a three-hour run under these conditions 131 grams of catalyst produced 107 grams of polymer. A yield of 54% polymer by weight based on the propylene charge was obtained which is equivalent to a yield of .18 gram of polymer per cc. of catalyst per hour or a yield of .27 gram of polymer per gram of catalyst per hour.

Example 3

A catalyst prepared by treating alumina gel with fluotitanic acid as described above was placed in a polymerization chamber. Substantially pure propylene was passed into the chamber at a rate of .28 gram of feed/hour/cc. of catalyst under a pressure of about 200 pounds per square inch and maintained at a temperature of about 505° F. During a one and one-half hour run under these conditions 150 grams of catalyst produced 48 grams of polymer. Thus a yield of 57% polymer by weight based on the propylene charge was obtained which is equivalent to a yield of .16 gram of polymer per cc. of catalyst per hour or a yield of .21 gram of polymer per gram of catalyst per hour.

The above examples clearly demonstrate the effectiveness of my new catalysts in converting normally gaseous hydrocarbons to higher boiling hydrocarbons. In the conversion of olefinic stocks at temperatures of between about 350° F. and about 700° F., the reaction is predominantly one of olefin polymerization. However, when a charge including a mixture of normally gaseous paraffins and olefins, for example a mixture containing between about 25 and 50% of olefins, is treated at temperatures within the range of between about 700° F. and about 900° F. or higher, improved yields of normally liquid product are obtained, both the paraffins and the olefins being converted. A portion of the normally gaseous charge to the catalyst can be obtained from the gases separated from the reaction products which are recycled in the process, and can comprise all the olefins charged to the catalytic conversion. Although I do not intend to be limited by any theory of reaction, the high temperature conversion appears to include an alkylation of paraffins by the olefins in addition to polymerization of the olefins. In any event the normally gaseous paraffins as well as olefins disappear from the charging stock when the conversion is conducted in the higher temperature range in the presence of my catalyst.

A check run was made with untreated alumina gel alone as the catalyst. Substantially pure propylene was passed into the chamber at a rate of about .17 gram of feed/hour/cc. of catalyst at a pressure of about 200 pounds per square inch and maintained at a temperature of about 500° F. During a three-hour run under these conditions substantially no polymer was formed, there being only 8 grams of product which is equivalent to a yield of only 0.01 gram product per cc. catalyst per hour or a yield of 0.02 gram of polymer per gram of catalyst per hour. It is apparent that alumina gel alone has substantially no polymerization activity.

Alumina for use in preparing the catalysts employed in the operations above described can be an activated alumina prepared for example by the reaction of a solution of sodium aluminate with an acid or by the reaction of a solution of an aluminum salt with a base, followed by drying and igniting of the resulting gel. Aluminas also can be prepared by precipitating a solution of an aluminum salt with ammonium hydroxide using a 25% excess of the latter. The gel is washed quickly with hot water and dried first at about 150° F. and later at about 1000° F. A suitable alumina gel is commercially available from the Aluminum Corporation of America and is designated as Alumina H-40 and H-50.

An activated solid alumina can be prepared by reacting amalgamated aluminum with water in the presence of a peptizing agent of the class consisting of formic acid and acetic acid at a temperature within the approximate range of between about 160° F. and 210° F. with rapid stirring. The reaction is begun with an acid concentration in the general vicinity of about 1% and the acid concentration is increased as the reaction proceeds until an acid concentration is reached which will permit the formation of a sol having an alumina content within the approximate range of between about 3 and 8%. The stirring is continued at the high temperature until a sol is obtained having such an alumina content and the resulting sol is separated from mercury and undissolved aluminum. The separated sol is gelled in thin layers and dried. The dried gel is heat treated by slowly increasing its temperature up to between about 950 and 1000° F., while passing an inert gas therethrough. Regulated amounts of oxygen are added to the inert gas during the heat treating step to effect decarbonization of the gel. The decarbonized gel is then calcined for a substantial period of at least about 24 hours at a temperature in the general vicinity of about 1100° F. The calcined alumina is crushed and pelleted or otherwise formed into particles of the desired size.

I prefer to use alumina treated with the complex fluoric acids of the amphoteric elements of groups III and IV as my hydrocarbon conversion catalyst but catalysts including other metals such as magnesium, beryllium, cerium, thorium, and in general the metals of groups II, III and IV of the periodic table can be used.

It is evident from the above examples that the catalysts described herein are active catalysts for the conversion of normally gaseous hydrocarbons to normally liquid hydrocarbons and it is apparent that many widely different embodiments of this invention exist without departing from the spirit and scope thereof and therefore it is not intended to be limited except as indicated in the appended claims.

I claim:

1. The process which comprises converting normally gaseous hydrocarbons to normally liquid products in the presence of a catalyst prepared by treating an alumina gel with a complex fluoric acid.

2. The process which comprises converting normally gaseous hydrocarbons to normally liquid products in the presence of a catalyst prepared by treating alumina gel with a complex fluoric acid selected from the group consisting of fluoboric, fluosilicic and fluotitanic acids.

3. The method of converting normally gaseous hydrocarbons to hydrocarbons of higher boiling points which comprises contacting said normally gaseous hydrocarbons under conditions suitable to effect said conversion in the presence of a divided solid catalyst comprising alumina which has been treated with a water solution of a complex fluoric acid to convert at least a substantial part of the alumina to a catalytically active salt of the complex fluoric acid.

4. The process of polymerizing normally gaseous hydrocarbons containing olefins to normally liquid hydrocarbons comprising subjecting said hydrocarbons to the polymerization action of a solid catalyst comprising alumina in which at least a substantial part of the alumina surface has been converted to a catalytically active salt of a complex fluoric acid.

5. The process of polymerizing normally gaseous monoolefinic hydrocarbons which comprises subjecting said hydrocarbons to the polymerization action of a solid catalyst prepared by treating alumina gel with a water solution of a complex fluoric acid selected from the group consisting of fluoboric, fluosilicic and fluotitanic acids, slowly evaporating the treated material to dryness, and heating the residue to about 800° F.

6. The process of preparing an active catalyst for converting normally gaseous hydrocarbons to normally liquid hydrocarbons which comprises treating alumina gel with a water solution of a complex fluoric acid selected from the group consisting of fluoboric, fluosilicic, and fluotitanic acids, slowly evaporating the treated material to dryness, and activating the residue by heating slowly to about 800° F.

7. A catalyst for converting normally gaseous hydrocarbons to normally liquid products prepared by treating alumina gel with a water solution of a complex fluoric acid selected from the group consisting of fluoboric, fluosilicic and fluotitanic acids, slowly evaporating the treated material to dryness, and activating the residue by heating slowly to about 800° F.

8. The process which comprises contacting normally gaseous paraffins and olefins at a temperature above about 700° F. with a catalyst prepared by treating alumina with a complex fluoric acid whereby normally liquid products are produced.

9. The process of preparing liquid reaction products of normally gaseous olefins comprising contacting olefinic hydrocarbon vapors at a temperature between about 350 and 900° F. in the presence of a conversion catalyst prepared by treating alumina with a complex fluoric acid of an amphoteric element selected from groups III and IV of the periodic table.

10. The process which comprises the steps of charging normally gaseous olefins to a catalytic contacting zone, contacting said olefins in the vapor phase at a temperature above about 350° F. with a catalyst prepared by treating an alumina gel with a complex fluoric acid, and recovering normally liquid products from said zone.

11. A catalyst for converting hydrocarbons, said catalyst comprising a salt resulting from the combination of a metal selected from groups II, III, and IV of the periodic table, and a complex fluoric acid of an amphoteric element selected from groups III and IV of the periodic table, said salt being activated by heating slowly to about 800° F.

12. A catalyst for converting hydrocarbons to higher boiling normally liquid products, said catalyst being prepared by treating alumina with a water solution of a complex fluoric acid selected from the group consisting of fluoboric, fluosilicic, and fluotitanic acids, slowly evaporating the treated material to dryness and activating the residue by heating slowly to about 800° F.

JOHN A. ANDERSON.